United States Patent Office 3,515,405
Patented June 2, 1970

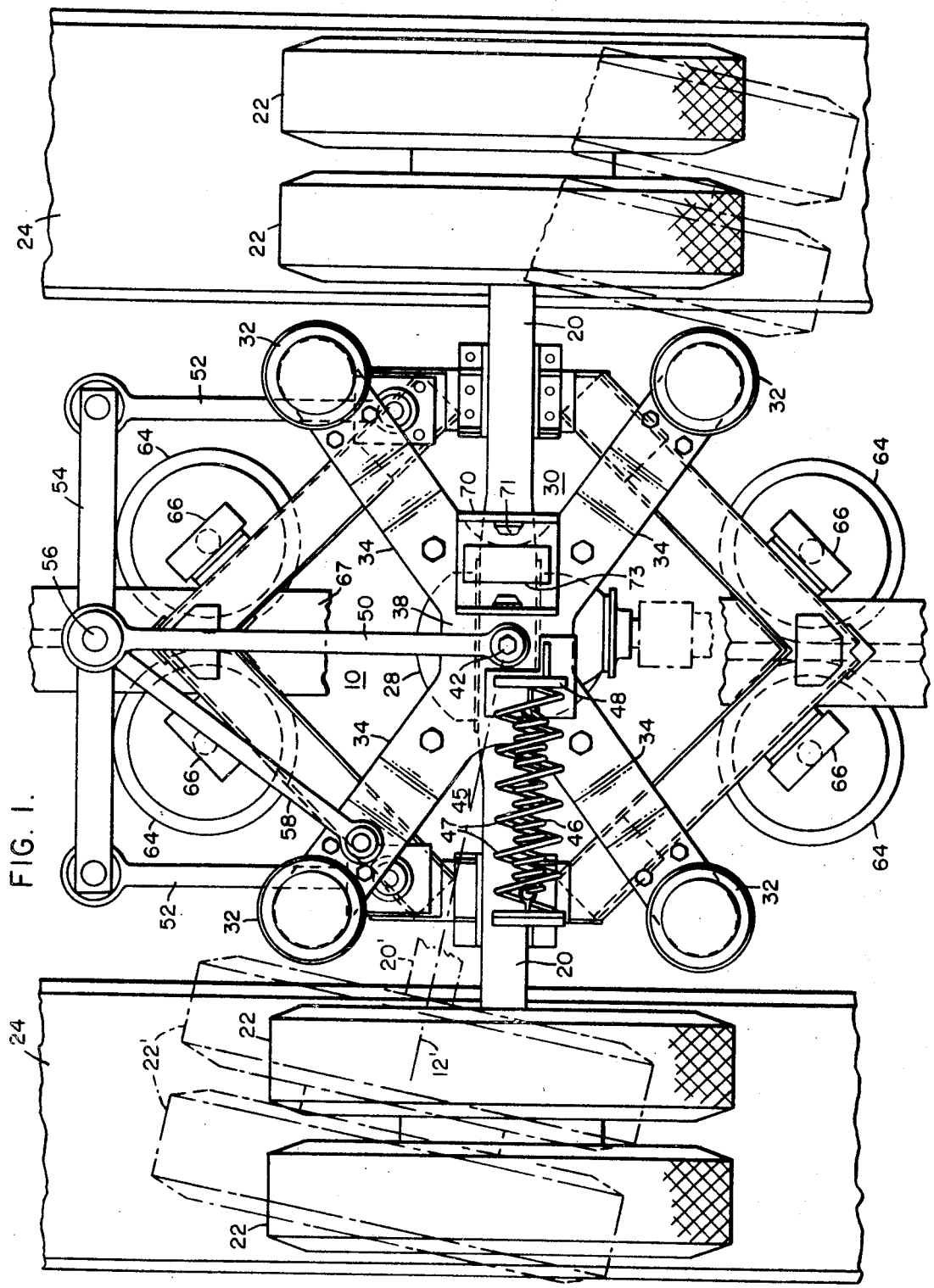

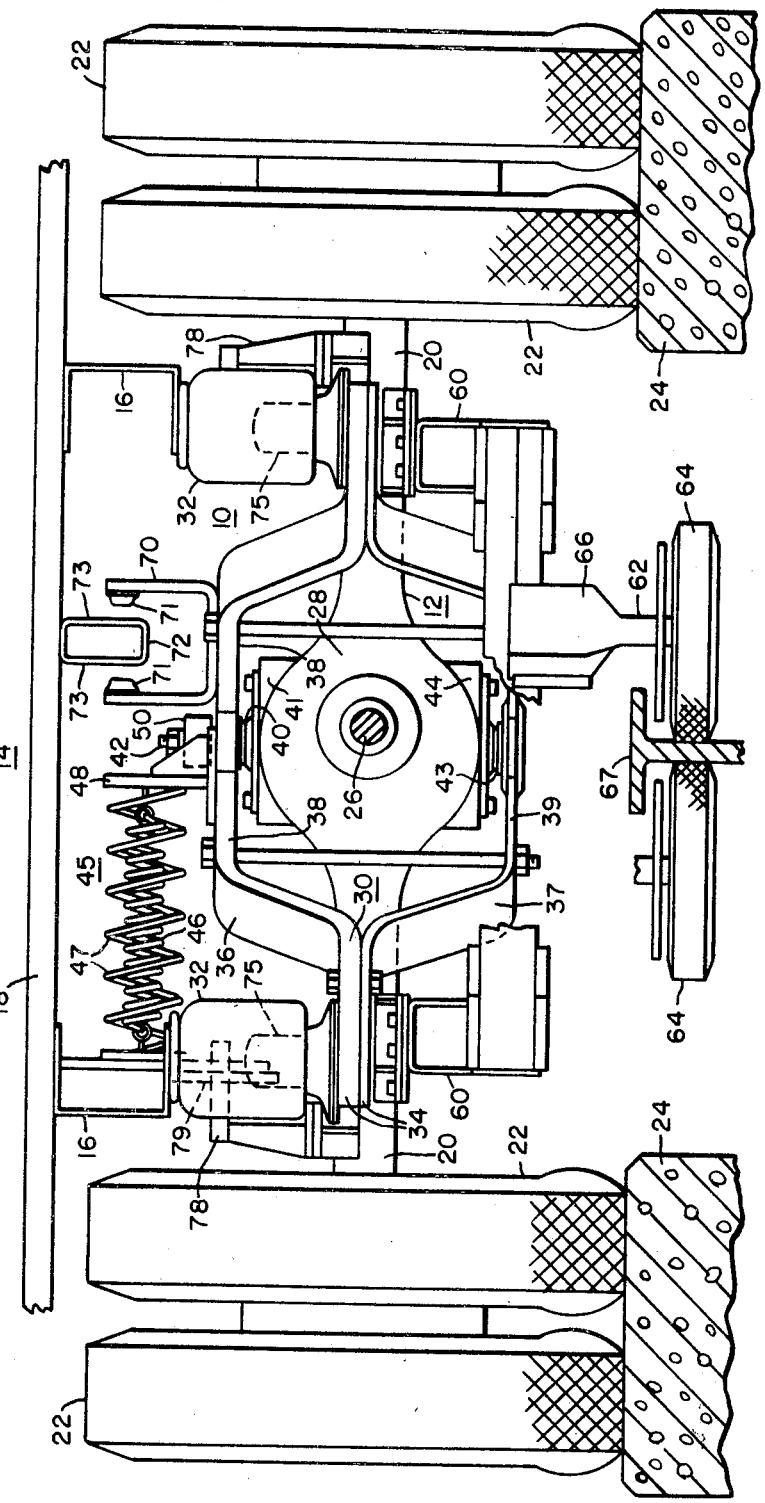

3,515,405
AXLE SUSPENSION SYSTEM FOR TRANSIT VEHICLES
William R. Segar, Monroeville, Pa., assignor to Westinghouse Electric Corporation, Pittsburgh, Pa., a corporation of Pennsylvania
Filed Feb. 2, 1968, Ser. No. 702,632
Int. Cl. B60g 9/02
U.S. Cl. 280—113                               7 Claims

ABSTRACT OF THE DISCLOSURE

The invention comprises a suspension system for a transit vehicle having an underframe and a structure for housing an axle and a differential mechanism. Upper and lower arms of a spring support bracket are rotationally fastened to the top and bottom portions respectively of the differential housing. Spring means are vertically disposed between the vehicle underframe and the support bracket, and horizontally disposed spring means are supported between a center portion of the support bracket and a portion of the vehicle underframe laterally removed from the center portion. Radius arms are employed to mechanically connect and transmit tractive forces from the axle housing structure to the vehicle in a manner allowing relative movement of the axle with the support bracket about a vertical axis extending through the differential mechanism.

BACKGROUND OF THE INVENTION

The invention relates generally to transportation vehicles, and particularly to a suspension system for vehicles of the self-steering or self-guiding type.

In U.S. Pat. 3,312,180 issued Apr. 4, 1967 to Erich O. Mueller and assigned to the present assignee, there is shown and described a self-steering transit vehicle having a suspension system in which axle swivel characteristics are essentially load dependent, i.e., the axle swivel produces steering moments which vary in magnitude and direction with changes in the weight of the vehicle. Steering moments are defined generally as the amount of twisting force required to rotate wheels, axles and related components with respect to the vehicle body.

As shown in the patent, four spring means, which may be air springs, are supported between vehicle frame members and guide wheel frame structures bolted solidly to the axle housing. When the vehicle negotiates a curve, extreme steering moments are created by axle swivel or rotation against the air springs. To reduce the extent of these steering moments, it has been the practice to use four coil springs in combination with the air springs. The coil springs are disposed adjacent the air springs, and firmly secured between the vehicle frame and guide wheel structures like that of the air springs.

To minimize the dependency of axle steering characteristics on the load of the vehicle using the coil and air spring combination, an optimum stiffness or spring rate value for the coil and air spring combination is chosen for a predetermined car load or weight, the air springs being maintained at a predetermined air pressure value to insure proper car height for that load. With a change in loading, however, the optimum spring stiffness is no longer optimum for the new load while the pressure within the air springs is changed in accordance with the change in load in order to maintain proper car height.

Thus, even with meticulous spring design, axle swivel continues to produce steering moments with changes in load since each spring design is for a particular load figure or at the most for a very narrow load range.

Further, such a suspension system is restricted in application because of spring design characteristics created by axial swivel. These design characteristics are produced by the integration of functions such as axle swivel, vehicle lateral movement and vertical springing. Thus, the same suspension system, with its particular design characteristics, cannot be used with vehicles having different lengths and wheel bases, for example.

BRIEF SUMMARY OF THE INVENTION

Broadly, the present invention provides a more widely applicable suspension system in which a non-load-dependent axle swivel characteristic is attained by mounting vehicle supporting springs on a support bracket secured to the top and bottom portions of a differential housing operatively associated with the vehicle. Anti-friction bearings are used at the top and bottom securing locations on the differential housing to give freedom of rotating motion to the axle for negotiating curves, and to provide a suspension system independent of axle swivel characteristics. The top and bottom securing of the support bracket further serves to stabilize the vehicle and suspension system about the differential when load conditions fluctuate on individual springs, for example, when the vehicle negotiates a curve or when passenger loading changes from one side of the car to the other.

Lateral flexibility is provided in the system by use of a tension and compression spring arrangement mounted above the support bracket, and between a center portion thereof and a portion of the vehicle underframe laterally displaced from said center portion. This spring arrangement allows not only lateral flexibility, but provides also a restoring force required for lateral stability by returning the vehicle body to its neutral position over the axle when negotiating curves or when subjected to extreme side forces, for example, forces created by high velocity winds.

Further, with the present invention, economics are achieved in the structure supporting the guide wheels in a manner to be more fully explained hereinafter.

THE DRAWING

The invention, along with the objects and advantages thereof, will be more apparent with consideration of the following detailed description read in connection with the accompanying drawing in which:

FIG. 1 is a top plan view of a suspension system constructed in accordance with the principles of the invention; and FIG. 2 is an end elevation view of the suspension system of FIG. 1.

PREFERRED EMBODIMENT

Specifically. there is shown in the figures a suspension system 10 for one axle 12 of a two axle transportation vehicle 14, for example, a vehicle of the type shown in the aforementioned patent though the invention is not limited thereto. The vehicle 14 has longitudinally extending frame members 16 (FIG. 2) attached to a cross member or portion 18 of the vehicle car body (not shown).

In the drawings, only one suspension system 10 and axle 12 is shown since the second system and axle for the vehicle 14 would be essentially the same.

The axle 12 comprises axle housing portions 20 enclosing driving axles (not shown) on which rubber-tired wheels 22 are mounted for rotation along tracks or roadbed 24 by traction motors (not shown) driving the axles in the housing 20 through a drive shaft 26 (FIG. 1) and a differential gear mechanism (not shown) disposed in an enlarged housing portion 28 centrally disposed between the axle housing portions 20.

In accordance with the invention, the vehicle 14 is supported on four arms or lateral extensions 34 of a cross-shaped spring support bracket 30 rotationally anchored to the differential housing 28 in a manner presently to be explained.

The support bracket 30 comprises essentially two structural members 36 and 37 shaped in such a manner that when placed together in the manner shown in FIG. 2 they form upper and lower members, respectively, converging together to form the arms 34 under the springs 32, and diverging apart to form inner, central portions 38 and 39 which extend respectively above and beneath the differential housing 28.

The upper central portion 38 of the support bracket 30 is secured to the center top portion of the differential housing 28 through a thrust bearing arrangement 40 suitably fixed on the top of said housing, for example, by a supporting platform structure 41 bolted to the housing, and nut and bolt means 42 secured thereto, as best seen in FIG. 2.

In a similar manner, the lower center portion 39 of the support bracket is secured to the center bottom portion of the differential housing 28 by bearing arrangement 43 fixed to said housing by a supporting platform 44.

The upper and lower bearings are vertically aligned so that relative horizontal rotation or swivel between the axle 12 and the support bracket 30 is allowed about a vertical axis extending through the differential housing 28. In this manner, the suspension 10 is made independent of axle 12 swivel characteristic when the vehicle 14 negotiates a curve. Further, because of this independence, the vehicle can now negotiate a curve having a lower minimum radius than that possible with prior art vehicles. Horizontal rotation or swivel of the axle 12, with the wheels 22, is shown in FIG. 1 in phantom and designated by corresponding prime numerals.

The securing of the support bracket 30 to the top and bottom centers of the differential housing 28 further serves to stabilize the suspension system 10 about the axis of the drive shaft 26 when load conditions fluctuate, for example when the vehicle negotiates a curve or when passenger loading changes from side to side.

The vehicle 14 is laterally suspended by a tension and compression spring arrangement 45 comprising an inner spring 46 held in tension and an outer spring 47 held in compression between at least one of the longitudinally extending frame members 16 and a plate 48 suitably fixed on the top center portion 38 of the support bracket 30 as best seen in FIG. 2. The spring arrangement 45 provides lateral flexibility for the suspension system 10 while simultaneously providing a force for restoring the vehicle to its neutral axis over the axles 12 which is required for lateral stability when the vehicle body is subjected to extreme side forces, for example, side forces resulting from high velocity winds, or from curve negotiation by the vehicle.

The axles 12 are attached to the vehicle 14 body through a connecting system comprising an upper radius arm 50, two lower radius arms 52 and a swivel arm or bar 54 pivotally secured to a thrust pin 56. The thrust pin 56 is suitably attached to the vehicle underframe at a location midway between the frame members 16. This connecting system transmits all the tractive forces created by the torque reaction of the axle 12 to the vehicle 14.

The upper radius arm 50 is mounted above the level of the axle centerline and is pivotally secured between the thrust pin 56 and the nut and bolt means 42 secured over the bearing 40 and bracket portion 38 fixed to the top of the differential housing 28. Ball joints or suitably similar means are employed at the connecting ends of the radius arm 50 to provide freedom of axle swivel about its center and freedom of vertical movement for the vehicle body.

In a similar manner, the lower radius arms 52 are connected through ball joints or similar means to the ends of the swivel bar 54 and to a guide wheel supporting frame 60 bolted solidly to the axle housings 20. The lower radius arms and their ball joints, in addition to transmitting axle torque reactions to the vehicle body, permit axle swivel as well as lateral and vertical body movement.

The swivel bar 54 is mounted on the thrust pin 56 by a ball joint arrangement or a rubber bushing to maintain a minimum restoring moment when the axle 12 swivels. This provides low resistance to axle steering in keeping with the objects of the invention.

A fourth radius arm 58 is connected at one end to one of the support bracket arms 34 and at the other end to the thrust pin 56. This radius arm prevents the support bracket 30 from rotating about its center axis. Ball joints or similar means are used on the connecting ends of the arm to provide freedom of motion necessary to obtain the required vertical and lateral springing.

As best seen in FIG. 1, the guide wheel support frame 60 is essentially a diamond shaped structure in plan view. Such a shape requires less space, and is made possible by the present invention since the guide wheel frame is not employed to support the air springs 32. This, in turn, simplifies and reduces the cost of the guide wheel shafts 62 (FIG. 2) in a manner presently to be explained.

In the above-mentioned patent, the guide wheel shafts required cam machined end portions to obtain and fix preload adjustments on guide wheels 64 (only one of which is shown in FIG. 2) necessary for proper steering of the vehicle. In the present disclosure, the ends 66 of the guide wheel shafts 62 can be economically forged flat and suitably bolted to the support frame 60. Preload adjustment for the guide wheels 64 is simple since the adjustment can now be made by simply moving the guide wheel shaft structure (62, 64) in either direction along the frame 60. The guide wheels 64 run on a central guide rail 67 to guide or steer the vehicle, as more fully explained in the above-mentioned patent.

In FIG. 2, a U-shaped bumper structure 70, having rubber pads 71 fixed on the inside of the arms thereof, is shown attached to the upper center portion 38 of the spring support bracket 30. Between the pads 71 is disposed a tubular member 72 suitably attached to the underside of the cross member 18 of the vehicle 14, the member 72 providing bumper surfaces 73 for the pads. Only this simple, low cost bumper arrangement need be employed to limit the lateral movement of the vehicle body with respect to the axle 12, whereas in prior art suspension systems a smooth, lubricous bumper surface, such as a Teflon coated plate, was required to prevent the rubber pads from clinging to the bumper surface with axle swivel and vertical springing.

Vehicle body movement in a vertical direction is limited by means of resilient bumpers 75 (shown in phantom in FIG. 2) disposed inside and forming an integral part of the air springs 32. This design is also made simpler and less costly because of the spring support bracket 30 of the present invention. In prior art vertical spring arrangements, a Teflon coated plate was required for the vertical bumper to provide minimum resistance to axle steering as explained above with lateral bumper arrangements.

The suspension system 10, as shown in FIG. 2, may be further provided with safety hooks 78 which are firmly attached to the top portions of the axle housings 20, and extend up and over a bracket 79 (shown in phantom only) mounted on the lower portion of the frame members 16. Such safety hooks prevent the vehicle body from being overturned with respect to the axle 12, and, in addition, jointly serve as an emergency lateral stop, an emergency axle swivel limiting device, and a means for holding the axle in place when lifting the vehicle body.

Vertical and lateral shock absorbers (not shown) of a suitable type may be employed to damp vertical and lateral movement of the suspension system 10.

From the foregoing description, it should now be apparent that a new and useful suspension system has been disclosed in which an axle is free to rotate about its central vertical axis to negotiate minimum radius curves. This is accomplished by use of a spring support bracket 30 centrally pivoted above and below a differential housing the bracket supporting vertically disposed springs between arm portions 34 of the bracket and the vehicle underframe. In this manner, axle swivel characteristics are made nonload-dependent, and the spring system used therewith made more universal in application.

Though the invention has been described with a certain degree of particularity, it should be understood that changes may be made therein without departing from the spirit and scope thereof.

What is claimed is:

1. A suspension system for a transit vehicle having frame members forming part of the vehicle underframe, the system comprising:
    axle structure having top and bottom portions,
    a support bracket of cross-shaped configuration having extending arms, said bracket haivng upper and lower members anchored to said top and bottom portions respectively of said axle structure in a manner to allow relative rotation of said support bracket and axle structure about a vertical axis extending through said axle structure,
    first spring means supported vertically on said extending arms between said support bracket and the vehicle frame members,
    second spring means supported laterally between a center portion of said support bracket and portions of the vehicle frame members laterally disposed from said center portion,
    means pivotally connecting the axle structure to the vehicle underframe, and
    means for mechanically connecting said support bracket to the vehicle underframe.

2. The system recited in claim 1 in which the first spring means include air springs, and
    the second spring means includes a spring arrangement in which one spring is held in tension and another spring is held in compression.

3. The system recited in claim 1 in which the axle structure includes a differential housing having top and bottom portions, the upper and lower members of the support bracket being respectivly anchored thereto.

4. The system recited in claim 1 in which the means pivotally connecting the axle structure to the underframe comprises:
    thrust pin means secured to the vehicle underframe,
    swivel bar means pivotally fastened to said thrust pin means to allow relative rotation of said bar means about said pin means, and
    at least two radius arms pivotally fastened between the axle structure and the ends of said bar means to allow relative rotation of said radius arms and said bar means.

5. The system recited in claim 1 including a thrust pin means secured to the vehicle underframe, and
    an upper radius arm having one end pivotally fastened to said thrust pin, and the other end pivotally fastened to the top portion of the axle structure.

6. The system recited in claim 1 including a frame for supporting guide wheels,
    said frame having essentially a diamond shaped configuration in plan view, and secured solidly to the axle structure.

7. The system recited in claim 1 including wheels for guiding the vehicle and a frame for supporting said guide wheels,
    said frame having essentially a diamond shaped configuration in plan view, and
    said guide wheels being adjustably secured to the sides of said frame.

References Cited
UNITED STATES PATENTS 3,305,038  2/1967  Carter _____ 180—50

PHILIP GOODMAN, Primary Examiner

U.S. Cl. X.R.

180—49